United States Patent Office 3,003,231
Patented Oct. 10, 1961

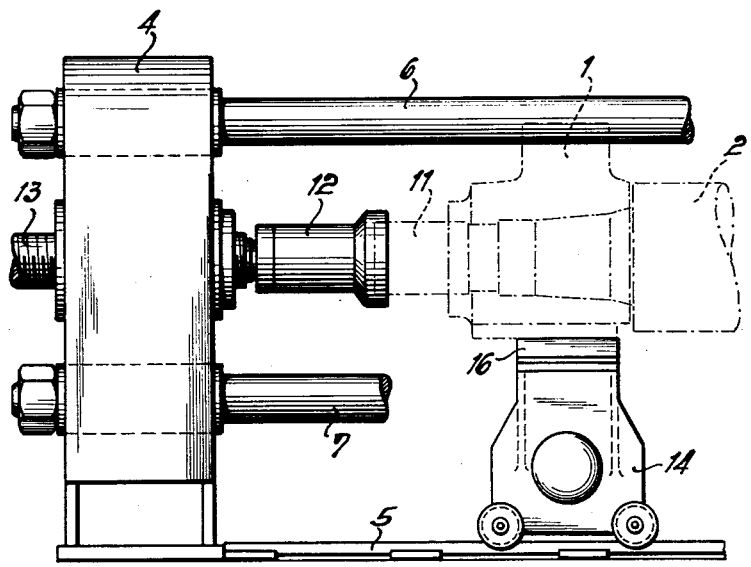

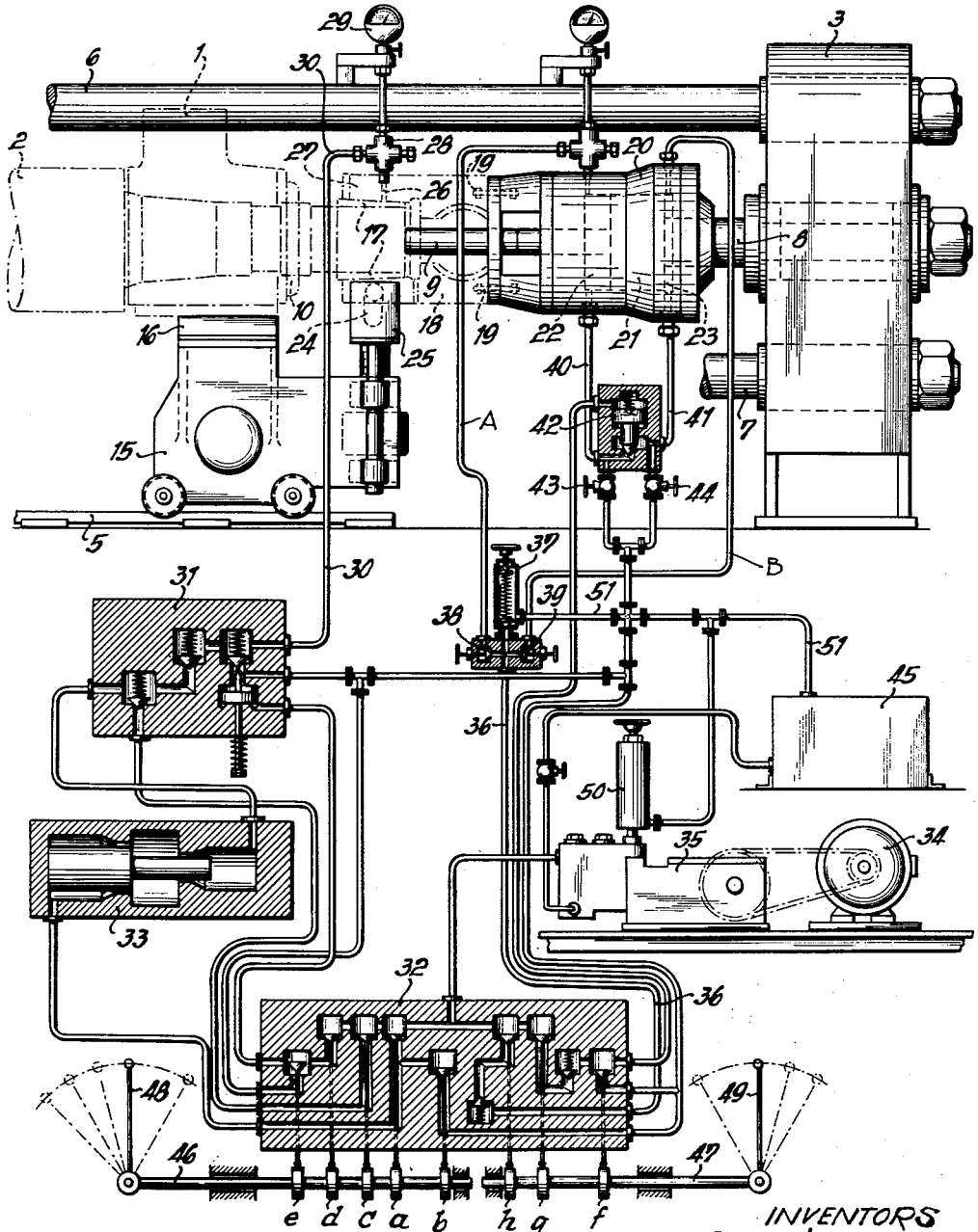

3,003,231
METHOD AND APPARATUS FOR DISASSEMBLING A CLUTCH FROM THE JOURNAL OF A ROLL
Gustav Tiess, Dusseldorf, and Heinz Norres, Dusseldorf-Ratingen, Germany, and Emil Feltes, Niedercorn, Luxembourg, assignors to Schloemann Aktiengesellschaft, Dusseldorf, Germany
Filed Dec. 3, 1956, Ser. No. 625,949
Claims priority, application Germany Dec. 2, 1955
4 Claims. (Cl. 29—427)

For the establishment of reliable and force-locked connections in rolling mills, for instance in the connection of clutch members and roll journals, it has for some time been the practice more and more to use the pressure medium shrinking method. In this method oil under high pressure is forced between the pressure surfaces of the press union, so that the external body, that is the clutch member, expands, and then floating on a film of oil can without effort be slipped over the slightly conical roll journals. After the oil system has been rendered pressureless, the clutch member contracts and forces out the oil which is present between the pressure surfaces. The connection is thereby rendered force-locked. Just as easily the connection can be released, through the clutch member being expanded, until it floats on a film of oil. It is then either automatically forced off by the conicity of the journal or drawn off the journal.

For the engagement or disengagement of heavy working parts, such as a clutch member in the case of a roll, special devices become necessary for the placing in position or drawing off of the clutch member, as the clutch members, often weighing over two tons, cannot be placed in position or removed by hand. When the clutch member has been pushed on to the roll journal and the expanding operation commences, the conicity of the roll journal will cause a component of the expanding force to become effective axially to the roll, which component seeks to push away the clutch member. For this reason a pressure force is caused to act in the axial direction on the clutch member, which is greater than the component of the expanding force and operates in opposition to it. For the removal of the clutch member, the latter is expanded, the component of the expanding force, which acts in the axial direction, forcing the clutch member off. Should this component, however, be insufficient by itself to force off the clutch member, an additional pressure force which is equi-directional with the component of the expanding force is caused to act on the clutch member, causing it to be drawn off.

In carrying out this method it has been found however, that the pressure surface becomes damaged, more particularly when removing the clutch member. The cause of such damage is, that the piston operating in the removal direction, assisted by the component of the expanding force becoming operative in the same direction, draws the clutch member off the roll journal even before the expanding operation has been completed and the clutch member floats on an oil film. The edges of the clutch member, which are still bearing against the roll journal, will scratch the pressure surfaces, so that both the force-locking of the connection is thereby reduced, owing to the oil residues remaining in the scratches, and the creation of the pressure cushion which becomes necessary for the expansion of the clutch member is prevented. Moreover, the drawing off of the clutch member does not take place rapidly enough after the reaching of the floating state in this method of removal, as at the moment in which the clutch member commences to move, the expanding pressure drops and the clutch member again contracts and therefore scratches along the surface of the roll journal.

The invention has for its object, to develop a method and a device, by means of which the clutch member can be removed from the roll journal without much expenditure of energy, as quickly as possible and without damage to the pressure surfaces.

For this purpose it is proposed according to the invention for the removal of the clutch member to cause during its expansion the component of the shrinkage force, acting in the removal direction, to be counteracted by an approximately equal force, whilst, after the floating state of the clutch member has been reached, this force is to be converted suddenly into as great a force as possible acting in the opposite direction.

As the already known arrangements for the application and removal of the clutch member consist of pistons adapted to be acted on only from one side or the other, for carrying out the method according to the invention, a piston is proposed which is guided in a sliding cylinder and is acted on from both sides. Thus, there is only required for the application and removal a single sliding cylinder. By this means the difficulties and damage liable to occur especially in the removal of the clutch member are avoided, as the piston side opposing the component of the shrinkage force holds the clutch member in position, when acted on by the pressure medium until it floats on the oil film. This side of the piston can now suddenly be relieved of pressure and the opposite side of the piston, where admission has already taken place, can be fully acted on. By this means the clutch member floating on the oil film is drawn so rapidly off the roll journal that the shrinkage of the expanded clutch member will only set in after it has been withdrawn from the roll journal.

The application and removal of the clutch member is, however, to be carried through as rapidly and reliably as possible in view of the periods of rest. This, however, depends on the skill and endurance of the operators, which is required for operating the hitherto usual hand pumps for expanding the clutch member and for admitting pressure medium to the sliding cylinder. It is therefore further proposed according to the invention to provide a pressure medium control, by means of which selectively or simultaneously the expanding place and the two sides of the piston of the sliding cylinder may be connected with a motor-driven high pressure pump. Thus, for serving the pumps and for watching the application and removal of the clutch member only one operator will be necessary.

Now, in order to be able to carry out the different cycles of operation of the arrangement independently of one another, according to the invention there is associated both with the expanding place and with the sliding cylinder in each case a group of valves connected by a common supply line with the high pressure pump. In order to make it easier for the man in charge to control the individual valves of both the valve groups and to provide the possibility of a fixed operating platform, it is further proposed according to the invention to make all the valves of each valve group controllable by way of a shaft provided with cams by means of one lever. For controlling the separate operations only two operating levers are thus required.

As the requisite expanding pressure frequently amounts to many times the application pressure, the high pressure pump would normally have to be designed for the maximum pressure, so that during the pushing on operation unused pressure energy would be wasted. To obviate this disadvantage there is provided in accordance with the invention between the pressure medium control and the expanding place a pressure multiplier which can be put in operation optionally. The high pressure pump need thus only be designed to supply the pushing-on pressure. On a higher pressure being required for expanding the clutch member, the pressure multiplier is brought into operation.

In the hitherto known sliding cylinders it is of great disadvantage, that the piston bears with threaded bolts against the roll journal, for enabling it to act as an abutment for the sliding cylinder. Through the expanding pressure not only is the clutch member expanded, but the roll journal is compressed. As a consequence of this the threaded bolts may in some cases become jammed firmly in their bores and will then have to be turned off. Before the next pushing-on or drawing-off operation the threaded bores will have to be drilled out or fresh threaded bores for the threaded bolts will have to be provided in the roll journal. In order to eliminate this disadvantage as well in the device according to the invention and also to make it easier for the operator to handle the heavy rolls and clutch members, it is further proposed according to the invention to provide as a centring guide for the roll and as an abutment for the sliding cylinder a supporting frame for the roll. One end pedestal of the supporting frame is to support the piston rod of the sliding cylinder. The other end pedestal of the supporting frame is provided with an adjustable abutment arranged so as to be coaxial with the piston rod of the sliding cylinder. Between this abutment and the piston rod of the sliding cylinder the roll is secured in position in the supporting frame, with or without the provision of distancing bolts and interposed pieces in the axial direction.

According to a further feature of the invention, carriages are provided, which support the bearing places of the roll. In order to be able to support rolls of different dimensions, these carriages are to be shiftable parallel to the roll axis in the supporting frame.

In order during the application and removal of the clutch member to prevent the front edge of its bore rubbing along the pressure surface of the roll journal and damaging it, according to a further feature of the invention one carriage is to be provided with an outrigger arm, in the inclined rollers of which the clutch member is supported and guided so as to keep it centred.

Further details of the invention may be gathered from FIGS. 1a and 1b of the drawing, in which the device according to the invention and the control system are illustrated.

The roll 2 provided with its housing accessories or constructional parts 1 is moved by a crane into the supporting frame formed by the end pedestals 3 and 4, the base plate 5 and the tie-rods 6 and 7. In the end pedestal 3 is inserted the piston rod 8 which by way of its exchangeable distancing rod 9 acts on the roll journal 10. The roll journal 11 is acted on by way of an intermediate piece 12 by a housing screw 13, by which the roll 2 together with the piston rod 8 is fixed in position. In order to relieve the piston rod 8 and the housing screw 13 of the weight of the roll 2, the constructional parts 1 are supported each by a carriage 14 and 15 respectively guided in the base plate 5, exchangeable interposed pieces 16 being provided in accordance with the particular roll diameter.

On the roll journal 10 is a conical bush 17, on to which the clutch member 18 is shrunk. The latter is connected by two screw bolts 19 with the sliding cylinder 20, through which the piston rod 8 of the piston 21 is taken. By this means the sliding cylinder 20 with the clutch member 18 can be displaced in one direction or the other by suitable admission of pressure medium into the cylinder spaces 22 and 23 through pipes A and B respectively. The clutch member 18 is centred and supported by inclined rollers 24 which are supported in a fork-shaped, vertically adjustable projecting part 25 of the carriage 15.

For expanding the clutch member 18 the pressure medium can be brought through the bore 26 between the pressure surfaces 27. Into this bore 26 a cross-piece 28 can be screwed, which supports a pressure gauge 29 for keeping a check on the expanding pressure and is connected with the pressure supply line 30. This pressure supply line 30 is adapted to be connected by a high pressure control 31 by way of the hydraulic pressure medium control 32 selectively directly or with the interposition of a pressure multiplier 33 with the pressure pump 35 which is driven by a motor 34. For the application and removal of the clutch member 18 the cylinder spaces 22 and 23 also have pressure medium supplied to them by the pressure pump 35. The pressure supply pipe 36 which is connected with the pressure pump 35 by way of the pressure medium control 32 branches at the overflow valve 37 into two pipe lines which lead to the cylinder spaces 22 and 23 and can each be interrupted independently by the stop cocks 38 and 39. Connected up in the outflow pipes 40 and 41 of the cylinder spaces 22 and 23 is a hydraulically controlled change-over valve 42, by which the cylinder spaces 22 and 23 can be connected with one another and separated from one another. Each outflow pipe is provided with a stop cock 43 and 44 respectively, through which they can be connected to the oil reservoir 45.

By the pressure medium control 32 both the expanding and the application and removal operation can be controlled. The pressure medium control 32 consists of two groups of valves, of which one comprises the values $a, b, c, d, e$, for controlling the expanding operation, whilst by the valves $f, g, h$, the admission to the cylinder spaces 22 and 23 is controlled. The operation of the valves $a$ to $e$ and of the valves $f$ to $h$ is effected by way of two shafts 46 and 47 with cams offset with respect to one another by means of push rods. On the ends of the shafts 46 and 47, hand levers 48 and 49 are provided, which enable the operator to control all the valves $a$ to $h$ from one position. It will be understood that the levers 48 and 49 turn in planes perpendicular to the drawing, the representation of these levers in the plane of the drawing being merely diagrammatic.

When all the valves $a$ to $h$ are closed, the pressure pump 35 conveys the pressure oil by way of the overflow valve 50 into the outlet pipe 51 and so into the oil tank 45 again.

The device operates in the following manner:

For being shrunk on to the roll journal 10 the clutch member 18 is pushed by the sliding cylinder 20 on to the bush 17 of the roll journal 10, until a resistance becomes noticeable. For the admission of pressure medium to the cylinder space 22 for the pushing-on of the clutch member, the change-over valve 42 is closed by opening the valve $g$, and the stop cock 43 is also closed and the stop cock 38 opened. The stock cock 44 is opened, whilst the stop cock 39 is closed, in order to prevent admission to the cylinder space 23.

For expanding the clutch member 18, one after another the valves $b$ and $d$ are closed and the valves $c$ and $e$ are opened, so as to pre-expand the clutch member 18. Thereupon the valves $a$ and $h$ are alternately opened and closed, the valve $a$ connecting up the pressure multiplier 33 and the clutch member 18 being expanded, until it floats on an oil film and through subsequent momentary opening of the valve $h$ pressure medium is admitted to the cylinder space 22, which pushes on the expanded clutch member 18. This alternate opening and closing of the valves $a$ and $h$ is continued, until the clutch member has advanced far enough over the roll journal. When this has been effected, the valves $a, b, c, e, f, g, h$, are closed and only the valves $d$ is opened, in order that the pressure in the clutch member 18 may gradually decrease by way of the high pressure control 31 and the outflow 51. During this period the pressure in the cylinder space 22 remains, however, in order to allow the clutch member 18 completely to contract, the pressure medium to be expelled and thereby a force-locked connection with the roll journal 10 to be established. After some time the pressure in the cylinder space 22 can also be decreased by opening the valve f.

For unshrinking the clutch member 18 the sliding cylinder 20 is slid against the clutch member 18, for enabling it to counteract the component of the expansion pressure, which becomes effective in the axial direction. For this purpose half the pushing-on pressure is admitted to the cylinder space 22 by opening the valves e, h and g, and the stop cocks 44 and 38 and by closing the valves a, b, c, d, f and the stop cocks 39 and 43. When this state of pressure in the cylinder space 22 has been reached, a start may be made with the expanding of the clutch member 18, without there being any danger that it will be pushed away by the axial component of the expanding pressure, before it has completely eased off the roll journal 10 and floats on an oil film. In order that the pressure state in the cylinder space 22 shall be maintained, the valves h and g and the stop cock 38 are closed. When this has been done, the valve c and, when the expanding pressure has risen to 600 atmospheres, the valve a is opened, until the clutch member 18 has been expanded to such an extent that it floats on a film of oil. Action on the expanding place is stopped by closing the valve a, when by opening the valve b the pressure in the pressure multiplier 33 can decrease and the oil reservoir in the pressure multiplier 33 can be filled up again through the valve c which is still open. Thereupon the valves b and c are also closed. The axial component of the expansion pressure will now seek to push off the clutch member 18, but is prevented from doing so by the pressure medium imprisoned in the cylinder space 22. The valve f is then opened, causing the change-over valve 42 to open and allowing the pressure medium included in the cylinder space 22 to escape, on the one hand by way of the pipe 41 into the cylinder space 23 and on the other hand by way of the stop cock 44 into the oil tank 45. The pipe 41 has a considerably greater cross-section than the cross-section of flow of the valve 44, so that, on the change-over valve 43 being opened, in the effective cylinder space 23 of smaller cylindrical annular surface than the cylinder space 22 there will at first become effective a pressure assisting the drawing off of the clutch member 18. This will cause the clutch member 18 to ease completely off the roll journal 10. As however, the cylinder space 23 can only receive a portion of the oil forced out of the cylinder space 22, the excess oil must flow away through the stop cock 44. The relatively small cross-sectional area of flow of the stop cock 44 offers a certain resistance to the outflowing oil, whereby the forcing away of the clutch member 18 is damped.

Should the component of the expanding pressure, acting in the pushing off direction, ever fail to force the clutch member 18 off the roll journal 10, the valve f is closed and the valve g opened and thereby the change-over valve 42 closed. In addition, the stop cock 44 is closed, so that the pressure medium can no longer flow out of the cylinder space 23, whilst the stop cock 43 is opened in order to connect the cylinder space 22 with the outflow 51. The clutch member 18 floating on the oil film is then by momentarily opening and closing the valve h, whereby the cylinder space 23 has pressure medium admitted to it, drawn off by the sliding cylinder 20 from the roll journal 10.

For carrying out the method according to the invention any other kind of hydraulic control and admission can of course be adopted.

We claim:

1. A method of disengaging a clutch member having a hub from a conical portion of the journal of a rolling-mill roll, comprising the following steps: applying to the clutch member an axial pressure directed towards the roll journal, and at the same time expanding the hub of the clutch member by forcing oil in between the contact surfaces of the hub of the clutch member and the roll journal, so that the oil flows in between these contact surfaces as far as each marginal zone of the hub, which bears in a fluidtight manner upon the roll journal owing to the axial pressure applied, and then, while maintaining the oil pressure between the contact surfaces of the hub of the clutch member and the roll journal, suddenly reversing the existing axial forcing-on pressure into an axial withdrawing pressure, so that the marginal zones of the hub become released from the roll journal, and the hub of the clutch member, floating upon the film of oil, slips off the roll journal.

2. Means for removing a clutch member from the journal of a rolling mill, comprising: means for applying an axial thrust to the clutch member to press it towards the roll journal, means for simultaneously forcing liquid in between the contacting surfaces of the clutch member and the roll journal at such a high pressure as to expand the clutch member, means for suddenly eliminating the axial thrust applied by said first means and means for simultaneously applying an axial thrust of greater magnitude than said first thrust to said clutch member in the opposite direction to force said clutch member away from said roll journal, while maintaining the oil pressure between the roll journal and the clutch member.

3. Means for applying or removing a clutch member having a hub from a rolling-mill roll journal, comprising: a stationary frame within which the roll and the clutch member are accommodated, a pump for supplying liquid under pressure, a pipe receiving liquid from the said pressure pump and communicating with the space between the bearing surfaces of the hub of the clutch member and the roll journal, a sliding cylinder fixedly connected with the clutch member, a stationary piston inside the cylinder, a piston rod secured to the piston and bearing at one end against a fixed part of the stationary frame, and at the other end against the roll journal, an inlet pipe for admitting pressure liquid from the pump to the cylinder space on one side of the piston for pressing the clutch member on to the roll journal, valve means including an inlet stop cock controlling the flow of liquid through said inlet pipe, a second inlet pipe for admitting pressure liquid from the pump to the cylinder space on the other side of the piston for pressing the clutch member away from the roll journal, valve means including an inlet stop cock controlling the flow of liquid through said second inlet pipe, outlet pipes for the discharge of liquid from the cylinder spaces; exhaust stop cocks controlling said outlet pipes, and a change-over valve operable for connecting the two outlet pipes with one another at points preceding the exhaust stop cocks, the cross-sectional area of flow from the pressing on cylinder space through the open exhaust stop cock being less than the cross-sectional area of flow of the piping and the open change-over valve leading to the pressing off cylinder space.

4. Means for applying or removing a clutch member having a hub from a rolling-mill roll journal, comprising: a stationary frame accommodating the roll and a clutch member, a pump for supplying liquid under pressure, a pipe receiving liquid from the said pressure pump and communicating with the space between the bearing surfaces of the hub of the clutch member and the roll journal, a sliding cylinder fixedly connected with the clutch member, a stationary piston inside the cylinder, a piston rod secured to the piston and bearing at one end against a fixed part of the stationary frame, and at the other end against the roll journal, an inlet pipe for admitting pressure liquid from the pump to the cylinder space on one side of the piston for pressing the clutch member towards the roll journal, valve means controlling the flow of liquid through said inlet pipe, a second inlet pipe for admitting pressure liquid from the pump to the cylinder space on the other side of the piston for pressing the clutch member off the roll journal, valve means controlling the flow of liquid through said second inlet pipe, the effective cross-sectional area of the pressing on cylinder space being less than that of the pressing off cylinder space, outlet pipes for the discharge of liquid from the cylinder spaces, and means for suddenly closing the valve means controlling the flow through the pressing inlet pipe and at the same time opening the outlet pipe from the pressing on cylinder space.

References Cited in the file of this patent

UNITED STATES PATENTS

| | | |
|---|---|---|
| 961,375 | Seabrook | June 14, 1910 |
| 1,753,771 | Buckwalter | Apr. 8, 1930 |
| 1,964,524 | McIntosh | June 26, 1934 |
| 2,084,439 | Hamer | June 22, 1937 |
| 2,263,778 | Howard | Nov. 25, 1941 |
| 2,764,437 | Bratt | Sept. 25, 1956 |
| 2,764,806 | Woodard | Oct. 2, 1956 |
| 2,840,399 | Harless et al. | June 24, 1958 |